United States Patent [19]

Uraneck et al.

[11] 4,370,252

[45] Jan. 25, 1983

[54] EMULSION POLYMERIZATION PROCESS UTILIZING A HIGHLY DISPERSED ORGANOSULFUR MOLECULAR WEIGHT MODIFIER

[75] Inventors: Carl A. Uraneck; Earl Clark, both of Bartlesville, Okla.

[73] Assignee: Phillips Petroleum Company, Bartlesville, Okla.

[21] Appl. No.: 183,796

[22] Filed: Sep. 4, 1980

Related U.S. Application Data

[62] Division of Ser. No. 18,092, Mar. 6, 1979, Pat. No. 4,245,072.

[51] Int. Cl.³ ............................................. B01J 13/00
[52] U.S. Cl. .................................. 252/311; 252/312; 526/224
[58] Field of Search ................. 252/311, 312; 526/224

[56] References Cited

U.S. PATENT DOCUMENTS

| | | | |
|---|---|---|---|
| 2,549,962 | 4/1951 | Crouch et al. | 526/224 |
| 3,813,345 | 5/1974 | Urton | 252/312 |
| 4,155,873 | 5/1979 | Salazar et al. | 252/312 |
| 4,245,072 | 1/1981 | Uranck et al. | 526/195 |

*Primary Examiner*—Lucille M. Phynes

[57] ABSTRACT

A compositon sutiable for use as a molecular weight modifier in emulsion polymerization comprising a dispersion formed by admixing an organosulfur molecular weight modifier, an aqueous surfactant, an electrolyte, and a cosurfactant under conditions which reduce the average particle size of said molecular weight modifier to less than about 10,000 Å.

23 Claims, No Drawings

EMULSION POLYMERIZATION PROCESS UTILIZING A HIGHLY DISPERSED ORGANOSULFUR MOLECULAR WEIGHT MODIFIER

This application is a divisional of application Ser. No. 018,092, filed Mar. 6, 1979, and now allowed; U.S. Pat. No. 4,245,072.

FIELD OF THE INVENTION

The invention pertains to the preparation of highly dispersed organosulfur molecular weight modifiers submicron dispersions. In another aspect, the invention pertains to the adjustment of the regulating index of organosulfur molecular weight modifiers. In a further aspect, the invention pertains to aqueous emulsion polymerization systems employing organosulfur molecular weight modifiers.

BACKGROUND OF THE INVENTION

Organosulfur compounds have been employed in emulsion polymerization systems as molecular weight modifiers or regulators. For a satisfactorily high level of activity, conveniently measured by the regulating index, lower moleclar weight species heretofore generally have been employed, since the high molecular weight species exhibit low regulating indexes. The lower molecular weight species have higher volatilities, which frequently tend to leave undesirable readily apparent residual odors in the polymeric products. Higher molecular weight species, with lower volatilities, would be preferred, if the regulating index could be increased sufficiently.

It is known to preadmix and coagitate together an aqueous emulsifier and an organosulfur compound prior to addition of the balance of the aqueous polymerization mixture, such coagitation being a sufficiently thorough mixing of the modifier and emulsifier to afford significant reduction in the particle size of the organosulfur compound and to increase the regulating index. This has been done by such as shearing action, various mills, and the like, as described in U.S. Pat. No. 4,064,337 to Uraneck and Burleigh Dec. 20, 1977.

However, organosulfur compounds so-used have exhibited undesirable rates of loss, i.e., depletion, during the early stages of monomer conversion in the emulsion polymerization system. To alleviate this early depletion experienced in the coagitation approach, other steps have been taken. For example, a small amount of preformed polymer latex has been added to or with the emulsifier and modifier admixture, as described in U.S. Pat. No. 3,928,498 to Uraneck and Burleigh Dec. 23, 1975. Another approach has been to add during the coagitation of the modifier and emulsifier an additive such as a monomer-soluble-hydrocarbon diluent, or else a polymerizable monomer itself, as described in U.S. Pat. No. 4,013,824 to Uraneck and Burleigh, Mar. 22, 1977. Sometimes some loss of modifier has occurred during the coagitation step itself, and various reducing agents have been added to the coagitation step, such as described by Uraneck and Burleigh in U.S. Pat. No. 3,855,188 Dec. 17, 1974.

Even with the improvements attainable using these preemsulsifying processes, efficient effective use of the higher molecular weight modifiers is not always achieved. This necessitates the use of undesirable amounts of modifier, at least more than should otherwise be necessary, adding to the cost of the polymer and resulting in variations in product quality. It is certainly preferable for both economy and product quality with minimum residual odor to use minimum amounts of modifier consistent with effectiveness.

BRIEF DESCRIPTION OF THE INVENTION

Submicron dispersions of organosulfur compounds are obtained by a coemulsification system using a surfactant and an electrolyte, plus a cosurfactant, such as a petroleum sulfonate with potassium chloride and hexyl alcohol, resulting in dispersion of the organosulfur compound spontaneously or with the aid of only mild agitation.

Our invention is applied to aqueous emulsion polymerization processes in which the control or modification of polymer molecular weight is effected by means of a chain transfer mechanism employing organosulfur compounds as the chain transfer agents or molecular weight regulators or modifiers.

According to our invention, organosulfur compounds are converted into submicron dispersions resulting in an unexpectedly large increase in reactivity of these compounds as emulsion polymerization modifiers. The higher reactivity is shown by a higher regulating index as measured by the rate of depletion of the organosulfur compound in the polymerization mixture. By controlling the reactivity of the modifier by procedures described herein, the versatility of these modifiers is increased thus providing a means of attaining a continuous range of regulating index values with a given modifier. Furthermore, the molecular weight distribution of the polymers produced can be varied by the choice of the regulating index value employed in the polymerization. Our process allows for the efficient use of high molecular weight organosulfur compounds.

The regulating index r of the organosulfur compound submicron dispersion can be varied in several ways. These methods permit the use of any given organosulfur compound to make up a series of dispersions having a range of regulating indices, and also provide a means of broadening the range of values obtainable for any given organosulfur compound as a modifier.

DETAILED DESCRIPTION OF THE INVENTION

In accordance with our invention, (A) an organosulfur compound, (B) a surfactant, and (C) an electrolyte, and of (D) a cosurfactant and optionally (E) a hydrocarbon, are combined in an aqueous media to form a submicron dispersion prior to introduction into the balance of the polymerization admixture. A submicron dispersion of the modifier forms either spontaneously or with the aid of only mild agitation.

The regulating index r can be varied (I) by changing the weight ratio of the surfactant plus cosurfactant combination:modifier, since r normally increases as the relative amount of surfactant plus cosurfactant combination increase; (II) by the inclusion of a hydrocarbon in the submicron dispersion which provides further adjustment of r, since the hydrocarbon results in an increase or a decrease in r depending on the amount used and the specific hydrocarbon employed; (III) by the charge order employed and the addition method used for adding the modifier submicron dispersion to the polymerization soap solution; (IV) by varying the degree of neutralization of the surfactant (i.e., the percentage of the acid groups which is neutralized with base, such as and normally KOH).

The methods of preparing the submicron dispersion and its composition, as well as the method by which it is added to the polymerization reaction mixture allows for the formation of a highly reactive and efficient submicron dispersion of modifier having the desired regulating index, with essentially no loss of organosulfur compound. Furthermore, there is no requirement in our invention of a high rate of agitation, a lengthy time for submicron dispersion formation, or for sophisticated equipment.

Modifiers (A)

Our invention is applicable to any organosulfur molecular weight modifier or regulator employed in an emulsion polymerization system. Most preferably, it is applicable to organosulfur modifiers having a modifying index of greater than 0.1, more preferably greater than 0.3. Types of organosulfur modifiers include the presently preferred mercaptans, as well as dialkyl dixanthogens, diaryl disulfides, tetraalkylthiuram mono and disulfides, mercaptothiazoles, and the like, alone or in admixture.

Most used commercially at present are the mercaptan compounds, and of these presently preferred are the hydrocarbyl mercaptans containing 8 to 18 carbon atoms per molecule, including straight and branched chain, alkyl, alkenyl, and alkadienyl, as well as cycloalkyl, cycloalkenyl, cycloalkadienyl, and aryl, and combinations such as alkaryl and aralkyl compounds. The more preferred mercaptan modifiers for SBR, ABS, and similar polymerizations are those of tertiary alkyl configuration.

Suitable organosulfur compounds include n-octyl mercaptan, n-dodecyl mercaptan, t-nonyl mercaptan, t-dodecyl mercaptan, t-hexadecyl mercaptan, sec-octyl mercaptan, sec-tridecyl mercaptan, cyclododecyl mercaptan, aryl mercaptans such as 1-naphthalenethiol, bis(tetrahydrofurfural xanthogen), diphenyl disulfide, tetramethylthiuram disulfide, dithiobis(dithio-0,0'-dibutyl formate), 2-mercaptobenzothiazole, and the like. Mixtures or blends of any of these organosulfur compounds can also be used. Commercially available and suitable organosulfur compound modifiers often are mixtures of organosulfur compounds, e.g., mixtures of t-dodecyl, t-tetradecyl, and t-hexadecyl mercaptans.

The amount of organosulfur modifier employed can vary widely, depending upon the particular compound or mixture chosen, the polymerization temperatures, the emulsifier and other recipe ingredients, and the extent of modification desired. The process of this invention for highly dispersing the modifier permits the option of employing higher molecular weight organosulfur compounds which normally have not heretofore been used due to their low regulating index. This is possible due to the higher r regulating index for a given modifier attainable by the process of this invention.

Satisfactory modification can be obtained by employing on the order of 0.01 to 5 parts organosulfur compound per 100 parts monomer by weight (phm), with 0.05 to 2 phm being presently preferred, though greater or lesser amounts can be utilized where desired.

Surfactants (B)

A wide variety of surfactants (B) can be employed for preparing the submicron dispersion of modifier. Surfactants include rosin acid soaps, disproportionated rosin acid soaps, fatty acid soaps, mixtures of disproportionated rosin acid soaps with fatty acid soaps, alkyl or alkaryl alkali metal sulfonates, petroleum alkali metal sulfonates, higher alkyl alkali metal sulfates, amine and ammonium soaps, and other surface-active materials, and mixtures thereof. Nonionic emulsifiers also can be employed including such as the polyethers and polyols.

Amounts of surfactant employed for preparing the submicron dispersion of modifier can range widely, though most usually is in the range of about 100:1 to 1:100 weight ratio of surfactant:modifier preferably about 10:1 to 1:10, not including aqueous component.

Aqueous medium is employed for the modifier submicron dispersion. The amount of water is a matter of convenience as to amounts of materials to handle and is not limiting as far as making the submicron dispersion. Supplemental water for the emulsion polymerization process itself can be readily added later at that stage.

Electrolytes (C)

The electrolyte (C) is a water soluble ionizable compound. Conveniently and typically these are alkali metal or ammonium inorganic salts, although it is within the scope of this invention to use other water soluble metal salts as well as water soluble organic salts. Exemplary but non-limiting electrolytes include sodium chloride, potassium chloride, sodium carbonate, potassium carbonate, potassium phosphate, potassium dihydrogen phosphate, sodium borate, potassium bromide, potassium nitrate, potassium acetate, potassium sulfate, ammonium acetate, ammonium hydrogen phosphate, lithium iodide, lithium bisulfate, pyridine hydrochloride, triethylamine hydrochloride, and the like, and mixtures thereof. The electrolyte can be employed at a level of about 1:10,000 to 5:100 electrolyte:modifier (organosulfur compound plus hydrocarbon if present) weight ratio, more preferably about 5:1,000 to 2:100.

Cosurfactants (D)

The use of cosurfactants (D) for preparing the modifier submicron dispersion is especially preferred when fatty acid soaps or rosin soaps are employed as the (B) surfactant. The addition of a cosurfactant often results in the spontaneous formation of a highly dispersed emulsion, said highly dispersed emulsion often fitting the description of a microemulsion. Microemulsions which are thermodynamically stable will not separate on standing.

Suitable cosurfactants include organic alcohols, acids, or amines, having 3 to 20 carbon atoms per molecule, preferably 4 to 12 carbon atoms per molecule. The presently preferred alcohol is n-hexanol. Mixtures of two or more of these cosurfactants can be used.

Examples of suitable alcohols include propyl, isobutyl, n-hexyl, 2-ethylhexyl, n-octyl, n-nonyl, n-decyl, n-dodecyl, n-tetradecyl, n-hexadecyl, and the like, alone, or in admixture. Examples of suitable acids include n-butyric, caproic, caprylic, capric, stearic, and the like, alone, or in admixture. Examples of suitable amines include isopropylamine, n-amylamine, n-hexylamine, n-octylamine, n-decylamine and the like, alone, or in admixture.

The amount of (D) cosurfactant can vary broadly, most usually from about 10:1 to 1:500 weight ratio of cosurfactant:modifier, more preferably about 1:1 to 1:100.

The (E) hydrocarbon is a normally liquid hydrocarbon diluent or a polymerizable hydrocarbon monomer. Any of the hydrocarbon monomers can be employed which are described as emulsion polymerizable monomers. Presently preferred are the polymerizable conjugated dienes, or mono-vinyl-substituted aromatic compounds, and of these, butadiene or styrene. In practice we employ the monomer or one of the two comonomers which are to be polymerized, otherwise the ultimate product could represent a possibly less desirable terpolymer. In practice, styrene is handier to use than butadiene in situations of preparation of butadiene/styrene copolymers.

Examples of suitable diluents include aliphatic, cycloaliphatic, and aromatic hydrocarbons such as n-heptane, isooctane, dodecane, hexadecane, cyclohexane, ethylcyclohexane, toluene, ethylbenzene, cumene, p-cymene, decalin, and the like, either alone, or in admixture, as well as others unreactive in the polymerization reaction, preferably, though not necessarily limited, to those of 6 to 14 carbon atoms per molecule.

Amounts of hydrocarbon diluent or polymerizable monomer will vary depending primarily on the choice of surfactant and organosulfur compound and the regulating index value desired. It is suggested that the monomer or inert hydrocarbon, when employed, be added at an organosulfur compound:hydrocarbon or monomer weight ratio of 1:100 to 100:1, preferably 1:5 to 5:1. The use of a hydrocarbon affects r, and r may increase or decrease depending on the specific hydrocarbon and amount, as disclosed hereinafter in Example XI.

Preparation of Modifier Submicron Dispersion

Our invention involves the preparation of a highly dispersed aqueous emulsion of the modifier, i.e. a submicron dispersion, prior to its addition to the emulsion polymerization soap solution. In some instances, a microemulsion is formed.

Normally, the dispersions are prepared in closed vessels or containers, preferably under an inert atmosphere such as nitrogen. A preferred method for preparing the dispersion is to add together the (A) organosulfur modifier and the (B) surfactant, in an aqueous media which conveniently contains the (C) electrolyte, under mild agitation conditions to form a macroemulsion, i.e. an emulsion in which the particle size typically is of the order of 10,000 Å to 100,000 Å. This macroemulsion is not suitable for use as a polymerization modifier due to its non-reproducible modification characteristics. The macroemulsion can be formed by any suitable means including tumbling action, stirring, swirling, or other mild agitation method. The optimum time interval required to form the macroemulsion depends on the particular components and modifiers employed, but normally is in the range of a few seconds up to but normally less than one hour, more typically a range of a few seconds to a few minutes.

If an optional (E) hydrocarbon is to be employed for the purpose of obtaining a specifically desired regulating index value, it normally is conveniently added with the modifier and becomes a part of the macroemulsion. The total organic phase, that is the modifier plus the hydrocarbon, is used as the basis for establishing the surfactant:modifier weight ratio. In this instance, the "modifier" is considered to be the total amount of modifier plus hydrocarbon for purposes of determining the surfactant:modifier weight ratio.

Following formation of the macroemulsion of the (A) organosulfur modifier, (B) surfactant, and (C) electrolyte, and optional (E) hydrocarbon, the (D) cosurfactant may be added.

The formation of the highly dispersed emulsion can be initiated or accelerated by mild agitation. By mild agitation we mean such as mild stirring or swirling of the mixture, such as with a magnetic bar at 350–450 rpm or by a vertical 30.5 cm stroke at about 120/minute, although this often is not required. The formation of the highly dispersed emulsion or microemulsion is recognized by the change in appearance of the mixture. The milky or opaque appearance of the macroemulsion changes to hazy, translucent, or clear, as the result of a reduction in particle size with the consequent reduction in the amount of light scattering. The average particle size of the dispersed modifier is less than about 10,000 Å to 100 Å, preferably about 5,000 Å to 400 Å.

The r value of a given preformed modifier submicron dispersion can be changed by the addition of supplemental organosulfur modifier, surfactant, cosurfactant, electrolyte solution, hydrocarbon, or combinations thereof, to give the proper proportion of the various ingredients as required to achieve the chosen regulating index value.

An alternate method of preparing the modifier submicron emulsion involves the formation of a concentrated emulsion of all the monovinylarene monomer and all of the emulsifier called for in the aqueous emulsion polymerization recipe, so that the concentrated emulsion contains the organosulfur modifier, the electrolyte, and about 20 to 25% of the total water called for in the polymerization recipe. To this concentrated emulsion is added the recipe amount of cosurfactant to give a submicron dispersion of modifier and styrene. To this submicron dispersion then is added the remainder of the make-up water and any additional monomers, as well as all the other ingredients of the polymerization recipe with the exception of the activator. This mixture then is preemulsified by mixing or tumbling while bringing it to the desired polymerization temperature prior to adding the activator to initiate the polymerization.

Dispersing the modifier in the aqueous medium as submicron size particles according to any appropriate procedure markedly increases the reactivity of the organosulfur compounds as modifiers. The effect of dispersing the modifier as submicron particles is particularly advantageous in situations where the modifier initially exhibits a regulating index value of less than about 4 under conditions of a standard commercial polymerization rate for SBR-type systems. Cf. Uraneck, C. A., Rubber Chemistry and Technology 49, 610–649 (1976).

The increase in reactivity of a modifier can be interpreted quantitatively as an increase in the regulating index as measured by the rate of depletion of the modifier. Mercaptan depletion typically is followed by sampling the polymerization periodically and determining the mercaptan by the Kolthoff-Harris amperometric titration procedure as described in J. Poly. Sci. 2, 49 (1947). The regulating index, r, is defined as $$r = -d(\ln S)/dX$$

in which S represents the concentration of organosulfur compound and X the fractional conversion. Dispersing of the modifier as submicron size particles affords a range of r values within limits based on the inherent reactivity of the organosulfur compound employed, and the other components and their ratios used in preparing the submicron dispersion, the latter determining the size of the dispersed particles.

Preparation of the submicron dispersion is very different from ordinary preemulsification mixing which may be conducted as the complete polymerization mixture is tumbled or otherwise agitated when being brought to the desired polymerization temperature. Preparation of the submicron dispersion is a separate operation and takes place prior to the preemulsification step.

The weight ratio of surfactant plus cosurfactant-:modifier can be varied to affect r, since r tends normally to increase as this ratio increases.

The r value also is adjustable by varying the degree of neutralization of the (B) surfactant. The r value increases as neutralization increases. Thus, including a small amount of base, e.g., KOH, in the submicron dispersion recipe may tend to increase or decrease r, depending on the surfactant used since some come fully neutralized. For example, P. & G. fatty acids are 0% neutralized as received. Petroleum sulfonates are 100% neutralized as received. Disproportionated rosin acids are about 85% neutralized as received. Data in Example X show that excess KOH added beyond 100% neutralization lowers r. Thus, added KOH may increase or decrease r, depending on how much KOH is added and which surfactant is used.

Emulsion Polymerization

Initiators

Free-radical initiators useful in the emulsion polymerization process include any of the broad groups of compounds utilized for the purpose of emulsion polymerization systems, including redox initiator systems such as ferrous sulfate/hydrogen peroxide, potassium persulfate/sodium bisulfite, and the like, and more particularly the free-radical initiators classed as the monomer-soluble organoperoxides, organohydroperoxides, and azo compounds. Amounts expediently employed are of the order of about 0.01 to 5 phm, more preferred about 0.03 to 1 phm.

Exemplary initiators include Ji-t-butylperoxide, benzoyl peroxide, lauroyl peroxide, t-butyl peracetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, 2,2′-azobis(2-methylpropionitrile), and the like, and mixtures thereof.

The hydrocarbon soluble peroxides and hydroperoxides typically are used in conjunction with activators such as polyamine-ferrous iron, ferrous polyphosphate complexes, complex ferrous-sodium formaldehyde sulfoxylate, and the like.

Monomers

Monomers employed in a process incorporating our invention include any monomers polymerizable with a redox system or with free-radical polymerization initiators in emulsion polymerization processes, such as polymerizable conjugated dienes, alone or with monovinyl aromatic compounds, or with ethylenically unsaturated polymerizable monomers. Polymerizable conjugated dienes commonly employed include those containing 4 to 12, preferably for commercial availability 4 to 8, carbon atoms per molecule, such as 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, and the like. The conjugated dienes can be polymerized to form homopolymers or copolymers of two or more.

Polymers of conjugated dienes include copolymers formed by polymerizing one or more polymerizable conjugated dienes with one or more copolymerizable monomers. These include such as monovinyl-substituted or monopropenyl-substituted aromatic compounds, such as those of 8 to 20, more particularly for commercial availability 8 to 12, carbon atoms per molecule, including styrene, various of the alkyl styrenes such as p-methylstyrene, 1-propenylbenzene or beta-methylstyrene, halostyrenes such as 2,3-di-chlorostyrene; as well as other copolymerizable ethylenically unsaturated monomers including the polymerizable nitriles such as acrylonitrile or methacrylonitrile, esters of acrylic and methacrylic acid, e.g., ethyl acrylate and methyl methacrylate, vinyl esters such as vinyl acetate, other vinyl compounds such as vinyl halides exemplified by vinyl chloride, vinylpyridine; and the like.

The process also is useful in the preparation of SAN type resins, i.e., copolymers of styrene or substituted styrenes with the vinyl nitriles. Substituted styrenes include those of 8 to 20 carbon atoms per molecule such as alpha-methylstyrene, ortho-, meta-, or p-alkyl aromatic substituted styrenes; o-, m-, or p-halogenated styrenes wherein the halogen can be any of fluorine, chlorine, bromine, or iodine; and the vinyl nitriles include those of 3 to 12 carbon atoms per molecule such as acrylonitrile, methacrylonitrile, and the like, all as prepared in emulsion systems modified with organosulfur molecular weight modifiers. The highly dispersed modifiers are useful in preparing copolymers of styrene and acrylates including any of the esters of acrylic and methacrylic acid such as methyl, ethyl, butyl acrylates and methacrylates. Latexes of these latter copolymers are particularly suitable for latex base paints.

A further class of polymers which can benefit from the process of our invention are ABS compositions made by the emulsion process. In the ABS process, an emulsion or latex of an unsaturated elastomer is first prepared, and the polymerizable monomers or various combinations of monomers such as the styrenes, vinylnitriles, acrylates, then are co- or terpolymerized in the presence of the elastomeric dispersion.

EMULSIFIERS

The emulsifiers suitable for use in the emulsifier solution used in the polymerization reaction mixture are the same compounds and mixtures useful in the preparation of the modifier submicron dispersion. These compounds are described hereinbefore in the section entitled "Surfactants". The emulsifier employed for the polymerization reaction mixture and the surfactant used to prepare the modifier submicron dispersion can be the same or different for any given polymerization, so long as the types employed are compatible with each other. The amount of emulsifier employed in the aqueous polymerization system can be any suitable effective amount. Typically, sufficient emulsifier is used to provide about 0.5 to 15 phm (parts by weight per hundred parts by weight monomer), preferably about 2.5–7.5 phm.

POLYMERIZATION CONDITIONS

Methods of Addition and Charge Order Of Modifier Submicron Dispersion To Polymerization Emulsifier Solution The modifier submicron dispersion can be added to the polymerization emulsifier solution by batch, continuous, or incremental methods. These additions may be either onto or below the surface of the polymerization emulsifier solution. To minimize loss of modifier prior to initiation and to minimize modifier abnormal depletion, the addition of the modifier submicron dispersion preferably is made after preemulsifying the monomers with the recipe emulsifier solution. Addition of modifier submicron dispersion to or through the styrene layer of a nonpreemulsified solution, or to a polymerization emulsifier mixture which has been allowed to reseparate, results in destruction of the effectiveness of the modifier submicron dispersion and consequently there is obtained a nonreproducible, low regulating index value. Thus, it is preferable to make the addition while stirring the preemulsified polymerization emulsifier solution to assure that the modifier submicron dispersion is introduced into a truly emulsified polymerization system or dispersion.

The regulating index r of a given modifier submicron dispersion can vary depending on when it is added and the method chosen for its addition. Thus, for example, a higher regulating index is obtained for a given modifier submicron dispersion if it is added continuously in a dropwise manner onto the surface of the stirred recipe emulsifier solution (prior to addition of monomers) than when it is added dropwise onto the surface of the static emulsifier solution, and furthermore, a higher regulating index is obtained when a given modifier submicron dispersion is added forcibly in one batch under the surface of the stirred emulsifier solution than when it is added forcibly in one batch onto the surface of the stirred emulsifier solution.

If incremental addition of the modifier submicron dispersion is used, and the surfactant used in making the modifier submicron dispersion is different from the emulsifier used for the polymerization emulsifier solution, it is preferable to precondition the second and subsequent increments of the modifier submicron dispersion with a small amount of recipe emulsifier solution before adding these increments to the polymerization emulsifier solution. If this preconditioning step is omitted, the second and subsequent increments may not exhibit the same rate of depletion as the first increment, and consequently there may be exhibited some different regulating index. Preconditioning the second and subsequent increments results in these increments behaving approximately the same as the first increment. The reactivity of the modifier submicron dispersion can vary depending on when it is charged to the polymerization soap solution. It is preferred to charge the modifier submicron dispersion after the preemulsification step and just prior to polymerization initiation. Addition of the modifier submicron dispersion prior to preemulsification of the polymerization emulsion solution can result in loss of modifier before polymerization initiation and also abnormal (accelerated) depletion of the modifier during the early stages of the polymerization.

The organosulfur modifier can be employed in the emulsion polymerization system over a wide range, such as about 0.0125 parts of (A) organosulfur compound per 100 parts monomer by weight, or as desired for molecular weight modification.

Polymerization conditions of temperature, time, pressure, and the like can range widely, depending upon particular materials and reactor conditions desired or convenient to employ, the monomers involved, relative volatility thereof, amounts of water, and equipment involved. The water to monomer ratio can vary widely, such as about 5:1 to 0.2:1.

Polymerization commonly is carried out by continuously agitating the polymerization emulsion under an inert atmosphere, e.g. nitrogen, at polymerization temperatures expediently in the range of about $-40°$ to $+100°$ C., preferably about 0° to 50° C. The pH range can vary widely such as about 1 to 12, and presently preferably about 7 to 10.8. The solids content can range widely, such as about 5 to 70 weight percent. Typically, butadiene is polymerized to about 20 weight percent.

After the degree or extent of polymerization desired has been accomplished, the polymerization reaction can be terminated with a shortstop. An antioxidant also usually is added to protect the polymer. The emulsion process results in a latex from which the polymer can be recovered by a process known as creaming, i.e., the addition of an aqueous salt solution such as sodium chloride solution, and coagulation of the polymeric product by the addition of a dilute mineral acid such as sulfuric acid. The product then is collected by filtration, washed, dried in conventional drying equipment.

EXAMPLES

The following examples are intended to further illustrate our invention. Particular species employed, particular conditions, amounts used, are intended to be illustrative not limitative to the reasonable and proper scope of our invention.

The potassium salt of disproportionated rosin acid used in the Runs in the following examples was Dresinate 554 (Hercules), which, as received, is 80±1 weight percent total solids including 1.6±0.2 weight percent salt calculated as NaCl, with the remaining 20±1 being water. The sodium salt of disproportionated rosin acid added was Dresinate 979 (Hercules) which, as received, is 70±1 weight percent solids with 0.2 weight percent maximum salt calculated as NaCl, and 30±1 weight percent water. The petroleum sulfonate added was Petronate TRS 10 (Witco Chemical) which, as received, is 62 weight percent petroleum sulfonate, 33 weight percent mineral oil, 0.5 weight percent inorganic salt, and 4.5 weight percent water.

In the recipes, the parts by weight surfactant represent actual surfactant added and the water content of these as-received samples has been included in the parts by weight of water of each recipe. The sodium chloride, inorganic salts, and mineral oil present in the surfactants as-received have not been included or taken into account in determining the recipe, although they are inherently present in each recipe by virtue of their being present in the as-received surfactant mixture.

The n-dodecyl mercaptan used in the Runs in the following examples was essentially pure compound from Phillips Petroleum Company.

The t-dodecyl mercaptan was employed as Sulfole ® 120, an essentially 100% active material from Phillips Petroleum Company. The material is a mixed range of hydrocarbon chain lengths with the product an average of $C_{12}$.

The t-hexadecyl mercaptan was employed as Sulfole ® 160, an 81% active material from Phillips Petroleum Company. The material is a mixed range of hydrocarbon chain lengths with the product an average $C_{16}$. In the recipes, the parts by weight t-hexadecyl mercaptan represent the actual amount of the active material (based on the molecular weight of t-hexadecyl mercaptan) which was added, and the hydrocarbon residue which is also present in the Sulfole ® 160 has not been included or taken into account in determining the recipe, although this hydrocarbon residue is inherently present in each recipe by virtue of it being present in the Sulfole ® 160 as-received.

The n-octadecyl mercaptan was essentially pure compound from The Humphrey Chemical Company.

EXAMPLE I

The Runs in Example I illustrate the increase in reactivity of an organosulfur modifier, t-hexadecyl mercaptan, when added to an SBR 1500 polymerization system as a submicron dispersion prepared using petroleum sulfonate as the surfactant. The runs were made in accordance with Recipe I:

| RECIPE I SBR 1500 POLYMERIZATION SYSTEM | |
|---|---|
| | Parts by Weight |
| Emulsifier Solution | |
| Potassium salt of disproportionated rosin acid | 4.6 |
| KOH | 0.11 |
| KCl | 0.3 |
| Sodium salts of polymerized alkylnaphthalene sulfonic acids | 0.2 |
| Tetrahydrate of the sodium salt of ethylenediamine tetraacetic acid | 0.032 |
| Water | 170 |
| Organosulfur Compound Modifier | |
| t-Hexadecyl mercaptan | Variable |
| Monomers | |
| Butadiene | 70 |
| Styrene | 30 |
| Oxidant | |
| p-Menthane hydroperoxide | 0.06 |
| Activator Solution | |
| Tetrahydrate of the sodium salt of ethylenediamine tetraacetic acid | 0.032 |
| $FeSO_4.7H_2O$ | 0.01 |
| $NaO_2SCH_2OH.2H_2O$ | 0.05 |
| Water | 10 |
| Polymerization Temperature, °C. | 5 |
| Shortstop | |
| Sodium dimethyl dithiocarbamate | 0.16 |
| Water | 10 |

Run 1

In control Run 1, 0.4 part of the modifier t-hexadecyl mercaptan per 100 parts of total monomers (phm) was added neat to the polymerization reaction mixture. Charge order to the polymerization reactor: (1) emulsifier solution, (2) styrene, (3) t-hexadecyl mercaptan, (4) butadiene, (5) oxidant, followed by preemulsification; then addition of the activator solution. After addition of the oxidant and prior to the addition of the activator solution, the mixture was preemulsified by stirring for 30 minutes while bringing the mixture to the 5° C. polymerization temperature. The polymerization was carried out under a nitrogen atmosphere.

In inventive Run 2, a run of the invention illustrating the effect of adding 0.5 phm t-hexadecyl mercaptan organosulfur compound modifier as a submicron dispersion to the SBR 1500 polymerization system in Recipe I.

The submicron dispersion was prepared according to Recipe II:

| RECIPE II t-HEXADECYL MERCAPTAN SUBMICRON DISPERSION USING PETROLEUM SULFONATE AS SURFACTANT | |
|---|---|
| Ingredient | Parts by Weight |
| t-Hexadecyl mercaptan | 34.6 |
| Petroleum sulfonate | 10.7 |
| KCl | 0.5 |
| Water | 53.9 |
| n-Hexyl alcohol | 0.3 |

All ingredients except the n-hexyl alcohol were placed in a nitrogen purged capped glass bottle at ambient temperature and shaken mildly resulting in an emulsion having a cloudy appearance. The n-hexyl alcohol then was added dropwise to this macroemulsion to give a submicron dispersion having a translucent appearance after completion of the n-hexyl alcohol addition.

The charge order for Run 2 was (1) emulsifier solution, (2) modifier submicron dispersion, (3) styrene, (4) butadiene, (5) oxidant, followed by preemulsification; then addition of (6) the activator solution. A sufficient amount of the submicron dispersion was added to the polymerization reaction mixture to provide about 0.5 phm of the t-hexadecyl mercaptan. The modifier submicron dispersion was added dropwise in a continuous manner onto the surface of the static emulsifier solution, and this mixture then stirred mildly for a few seconds to give a homogenous mixture of the submicron dispersion in the emulsifier solution. The monomers and oxidant then were added to the static mixture and this reaction mixture preemulsified by mixing for 30 minutes while bringing to the 5° C. polymerization temperature. The activator solution then was added and the polymerization conducted with continuous stirring under a nitrogen atmosphere as described in Run 1.

Comparison of Control Run 1 vs. Inventive Run 2

The depletion of the t-hexadecyl mercaptan in Runs 1 and 2 was followed by periodic sampling and analysis based on the method of I. M. Kolthoff and W. E. Harris, J. Poly Sci. 2, 49 (1947). The increase in reactivity of the t-hexadecyl mercaptan as a modifier when added as a submicron dispersion is shown by a regulating index, as measured by the rate of depletion of the modifier, of 9.5 for inventive Run 2, compared to only 0.3 for control Run 1 in which the mercaptan was added neat to the polymerization reaction mixture.

EXAMPLE II

The Runs in this example illustrate the increase in reactivity of the organosulfur modifier t-dodecyl mercaptan when added to a SBR 1500 polymerization system described in Example I as a submicron dispersion prepared using petroleum sulfonate as the surfactant.

t-Dodecyl mercaptan was added neat in control Run 3 as described in Example I. In inventive Run 4, t-dodecyl mercaptan was added as a submicron dispersion, prepared according to Recipe III:

| RECIPE III t-Dodecyl Mercaptan Submicron Dispersion Using Petroleum Sulfonate as Surfactant | |
|---|---|
| Ingredient | Parts by Weight |
| t-Dodecyl mercaptan | 39.4 |

RECIPE III
t-Dodecyl Mercaptan Submicron Dispersion
Using Petroleum Sulfonate as Surfactant

| Ingredient | Parts by Weight |
|---|---|
| Petroleum sulfonate | 9.9 |
| KCl | 0.5 |
| Water | 49.6 |
| n-Hexyl alcohol | 0.6 |

The submicron dispersion was prepared, the polymerization conducted, and the regulating index determined in accordance with the procedures described in Example I.

A regulating index of 5.7 was obtained when 0.6 phm t-dodecyl mercaptan was added as a submicron dispersion in inventive Run 4, while a regulating index of only 2.6 was obtained when 0.5 phm t-dodecyl mercaptan was added neat in control Run 3, illustrating the increase in reactivity obtained when the organosulfur modifier is added as a submicron dispersion.

EXAMPLE III

The Runs in this example illustrate the increase in reactivity of an organosulfur modifier, t-dodecyl mercaptan, when added to a SBR 1500 polymerization system as a submicron dispersion, said dispersion being prepared using disproportionated rosin acid soap as the surfactant.

In invention Run 5, t-dodecyl mercaptan was added as a submicron dispersion, prepared according to Recipe IV:

RECIPE IV
t-Dodecyl Mercaptan Submicron Dispersion
Using Dispropionated Rosin Acid Soap as Surfactant

| Ingredient | Parts by Weight |
|---|---|
| t-Dodecyl mercaptan | 34.6 |
| Potassium salt of disproportionated rosin acid | 17.3 |
| KCl | 0.4 |
| Water | 47.1 |
| n-Hexyl alcohol | 0.6 |

The submicron dispersion was prepared, the polymerization conducted, and the regulating index determined in accordance with the procedures described in Example I. In inventive Run 5, a regulating index of 6.0 was obtained when 0.5 phm of t-dodecyl mercaptan was added as a submicron dispersion. This result compares to a regulating index of only 2.6 in control Run 3 of Example II when 0.5 phm t-dodecyl mercaptan was added neat. These runs illustrate the increased reactivity of the modifier t-dodecyl mercaptan when it is added as a submicron dispersion.

EXAMPLE IV

The Runs in this example illustrate the increase in reactivity of an organosulfur modifier, n-dodecyl mercaptan, when added to a SBR 1503 polymerization system as a submicron dispersion prepared using a potassium fatty acid soap as the surfactant.

Run 6 is a control run in which 0.5 phm of the organosulfur modifier n-dodecyl mercaptan was added neat to the SBR 1503 polymerization system in accordance with Recipe V:

RECIPE V
SBR 1503 Polymerization System

| | Parts by Weight |
|---|---|
| Emulsifier Solution | |
| Potassium fatty acid soap | 4.6 |
| KCl | 0.3 |
| Sodium salts of polymerized alkylnaphthalene sulfonic acids | 0.2 |
| Tetrahydrate of the Sodium Salt of ethylenediamine tetraacetic acid | 0.032 |
| Water | 170 |
| Organosulfur Compound Modifier | |
| n-Dodecyl mercaptan | Variable |
| Monomers | |
| Butadiene | 70 |
| Styrene | 30 |
| Oxidant | |
| p-Menthane hydroperoxide | 0.06 |
| Activator Solution | |
| Tetrahydrate of the sodium salt of ethylenediamine tetraacetic acid | 0.032 |
| $FeSO_4 \cdot 7H_2O$ | 0.01 |
| $NaO_2SCH_2OH \cdot 2H_2O$ | 0.05 |
| Water | 10 |
| Polymerization Temperature, °C. | 5 |
| Shortstop | |
| Sodium dimethyldithiocarbamate | 0.16 |
| Water | 10 |

The polymerization charge order and the polymerization procedure were the same as described in Example I for the SBR 1500 polymerization system.

In inventive Run 7, 0.5 phm n-dodecyl mercaptan was added as a submicron dispersion prepared according to Recipe VI:

RECIPE VI
n-Dodecyl Mercaptan Submicron Dispersion
Using Potassium Fatty Acid Soap as Surfactant

| Ingredient | Parts by Weight |
|---|---|
| n-Dodecyl mercaptan | 28.4 |
| Potassium fatty acid salt | 16.1 |
| KCl | 2.7 |
| Water | 46.0 |
| n-Hexyl alcohol | 6.8 |

The submicron dispersion was prepared and added to the polymerization system in Run 7 according to the procedure described in Example I.

In control Run 6, a regulating index of 0.55 was obtained when the n-dodecyl mercaptan was added neat. In inventive Run 7, a regulating index of 12.3 was obtained when the n-dodecyl mercaptan was added as a submicron dispersion. These runs illustrate the increase in reactivity is obtained when the modifier is added as a submicron dispersion.

EXAMPLE V

The Runs in this example illustrate the effect of the weight ratio of the surfactant plus cosurfactant:organosulfur modifier, viz. petroleum sulfonate plus n-hexyl alcohol:t-hexadecyl mercaptan, on the reactivity of the organosulfur modifier.

Three t-hexadecyl mercaptan submicron dispersions were prepared by the procedure described in Example I using different weight ratios of petroleum sulfonate plus n-hexyl alcohol:t-hexadecyl mercaptan according to the formulations given in Recipe VII:

RECIPE VII
Submicron Dispersions Using Different Weight Ratios of Petroleum Sulfonate Plus n-Hexyl Alcohol:t-Hexadecyl Mercaptan

| Ingredients | Parts by Weight Submicron Dispersions for | | |
|---|---|---|---|
| | Run 8 | Run 9 | Run 10 |
| t-Hexadecyl mercaptan | 36.9 | 34.7 | 31.0 |
| Petroleum sulfonate | 5.7 | 10.7 | 19.1 |
| KCl | 0.6 | 0.5 | 0.4 |
| Water | 56.7 | 53.8 | 49.0 |
| n-Hexyl alcohol | 0.1 | 0.3 | 0.5 |

A sufficient quantity of submicron dispersion was used so as to provide about 0.6 phm t-hexadecyl mercaptan in the SBR 1500 polymerization system described in Example I. Table I summarizes the change in the reactivity of the t-hexadecyl mercaptan modifier as the weight ratio of petroleum sulfonate plus n-hexyl alcohol:t-hexadecyl mercaptan increased:

TABLE I
Influence of Petroleum Sulfonate Plus n-Hexyl Alcohol: t-Hexadecyl Mercaptan Weight Ratio on Regulating Index

| Run | Petroleum Sulfonate Plus n-Hexyl Alcohol: Mercaptan Weight Ratio | Regulating Index |
|---|---|---|
| 8 | 1:6 | 4.0 |
| 9 | 1:3 | 7.7 |
| 10 | 1:1.6 | 10.3 |

The data in Table I show that as the weight ratio of petroleum sulfonate plus n-hexyl alcohol:t-hexadecyl mercaptan increased, that the modifying reactivity of the t-hexadecyl mercaptan also increased.

EXAMPLE VI

The Runs in this example illustrate the effect of the weight ratio of potassium and sodium salts of dispropionated rosin acid plus n-hexyl alcohol:t-hexadecyl mercaptan on the reactivity of the organosulfur modifier in a SBR 1500 polymerization system.

Three t-hexadecyl mercaptan submicron dispersions were prepared using the potassium salt of disproportionated rosin acids, and three submicron dispersions were prepared using the sodium salt of disproportionated rosin acids. Each dispersion was prepared according to Recipe VIII:

RECIPE VIII
Submicron Dispersions Using Different Weight Ratios of Potassium And Sodium Salts of Disproportionated Rosin Acid Plus n-Hexyl Alcohol:t-Hexadecyl Mercaptan

| Ingredients | Parts by Weight Submicron Dispersion for | | | | | |
|---|---|---|---|---|---|---|
| | Run 11 | Run 12 | Run 13 | Run 14 | Run 15 | Run 16 |
| t-Hexadecyl mercaptan | 34.5 | 34.5 | 35.0 | 34.9 | 34.9 | 34.9 |
| Potassium salt of disproportionated rosin acid | 5.3 | 10.6 | 21.6 | — | — | — |
| Sodium salt of disproportionated rosin acid | — | — | — | 5.4 | 10.8 | 21.6 |
| KCl | 0.6 | 0.5 | 0.4 | — | — | — |
| NaCl | — | — | — | 0.6 | 0.5 | 0.3 |
| Water | 58.0 | 52.8 | 42.9 | 58.6 | 53.5 | 42.8 |
| n-Hexyl alcohol | 1.6 | 1.6 | 0.1 | 0.5 | 0.3 | 0.4 |

The submicron dispersions were prepared and a sufficient quantity thereof was used so as to provide about 0.4 phm t-hexadecyl mercaptan in the SBR 1500 polymerization system as described for Run 2 in Example I. The reactivity of these submicron dispersions in modifying the SBR 1500 polymerization, as shown by the regulating index, is shown in Table II:

TABLE II

| Run | Disproportionated Rosin Soap | Surfactant plus Cosurfactant: Modifier Weight Ratio | Regulating Index |
|---|---|---|---|
| 11 | Potassium | 1:5 | 2.8 |
| 12 | Potassium | 1:3 | 4.1 |
| 13 | Potassium | 1:2 | 4.7 |
| 14 | Sodium | 1:6 | 3.4 |
| 15 | Sodium | 1:3 | 5.5 |
| 16 | Sodium | 1:2 | 12.4 |

The data in Table II illustrate the increase in reactivity of t-hexadecyl mercaptan as a modifier as the weight ratio of surfactant plus cosurfactant:modifier increases. Furthermore, the data illustrate that the sodium soap can provide a higher regulating index than the corresponding potassium soap.

EXAMPLE VII

The Runs in this example illustrate the effect of the charging technique on the reactivity of an organosulfur modifier, in an SBR 1500 polymerization system.

Modifier submicron dispersions, using disproportionated rosin soap as surfactant, were prepared according to Recipe IX:

RECIPE IX
t-Hexadecyl Mercaptan Submicron Dispersion Using Rosin Soap as Surfactant For Evaluating Effect of Charging Technique on Reactivity

| Ingredient | Parts by Weight |
|---|---|
| t-Hexadecyl mercaptan | 34.2–34.5 |
| Potassium salt of disproportionated rosin acid | 10.5–10.6 |
| KCl | 0.5 |
| Water | 52.2–52.7 |
| n-Hexyl alcohol | 1.7–2.6 |

The submicron dispersions so-prepared were used in an SBR 1500 polymerization system as described in Example I. The t-hexadecyl mercaptan submicron dispersions were used in three different polymerization runs at a level to provide about 0.4 phm of the modifier using the charge order and general procedure described in Run 2 in Example I, but with each of the three runs using a different charging technique as described as follows: (A) the submicron dispersion added continuously dropwise onto the surface of the static emulsifier solution; (B) the submicron dispersion added continuously dropwise onto the surface of the stirred emulsifier solution; and (C) the submicron dispersion injected forcibly in one batch onto the surface of the stirred emulsifier solution.

The reactivity of the modifier, as expressed by the regulating index, using each of these charging techniques, is shown by the data recorded in Table III:

TABLE III
Influence of Charging Technique on Regulating Index

| Run | Charging Technique | Regulating Index |
|---|---|---|
| 17 | A | 6.2 |
| 18 | B | 6.9 |
| 19 | C | 9.4 |

The data in Table III demonstrate that the reactivity of the organosulfur modifier varies with the charging technique employed, the highest reactivity occurring when the t-hexadecyl mercaptan submicron dispersion prepared using disproportionated rosin acid surfactant is added forcibly in one batch onto the surface of the stirred emulsifier solution.

In a similar manner, t-hexadecyl mercaptan submicron dispersions using petroleum sulfonate as surfactant were prepared according to Recipe X:

RECIPE X
t-Hexadecyl Mercaptan Submicron Dispersion Using Petroleum Sulfonate As Surfactant For Evaluating Effect of Charging Technique on Reactivity

| Ingredient | Parts by Weight |
|---|---|
| t-Hexadecyl mercaptan | 37.2 |
| Petroleum sulfonate | 11.5 |
| KCl | 0.5 |
| Water | 50.7 |
| n-Hexyl alcohol | 0.1 |

These submicron dispersions were tested for reactivity as a function of charging technique in the SBR 1500 polymerization system. The charging techniques used included procedures (A) and (C) as described above, plus one additional procedure (D) described as follows: the submicron dispersion injected continuously under the surface of the stirred emulsifier solution. The effect of charge technique on modifier reactivity is shown in Table IV:

TABLE IV
Influence of Charging Technique on Regulating Index

| Run | Charging Technique | Regulating Index |
|---|---|---|
| 20 | A | 5.1 |
| 21 | C | 6.0 |
| 22 | D | 6.7 |

These data demonstrate that injecting the t-hexadecyl mercaptan submicron dispersion, prepared using petroleum sulfonate surfactant, in a continuous manner under the surface of the emulsifier solution by Technique (D) Run 22 results in higher reactivity than addition onto the surface of the emulsifier solution by either a dropwise Technique (A) Run 20 or single batch addition Technique (C) Run 21.

EXAMPLE VIII

The runs in this example illustrate the effect of charge order on the reactivity of an organosulfur modifier, t-hexadecyl mercaptan, submicron dispersion used in a SBR 1500 polymerization system.

The submicron dispersion as described in Recipe X of Example VII was added to the SBR 1500 polymerization system at a level to provide about 0.7 phr of modifier using several different charge orders of the polymerization recipe ingredients:

(V) Submicron dispersion added dropwise to emulsifier solution prior to addition of other polymerization recipe ingredients (same procedure as described for Run 2 in Example I);

(W) Styrene added to emulsifier solution without stirring to give a two layered mixture. Submicron dispersion added dropwise to the styrene top layer of this unstirred mixture prior to addition of other polymerization recipe ingredients;

(X) Submicron dispersion added to neat styrene prior to addition of emulsifier solution and other polymerization recipe ingredients;

(Y) Styrene emulsified by stirring with emulsifier solution for 30 minutes. Submicron dispersion added dropwise to this static solution prior to addition of other polymerization recipe ingredients; and (Z) Emulsifier solution, monomers, and oxidant emulsified by mixing for 30 minutes while bringing to polymerization temperature. Submicron emulsion added dropwise to this static preemulsified mixture just prior to adding activator solution.

The general procedures described for Run 2 of Example I were used except where otherwise indicated. The influence of charge order on reactivity of the modifier is shown in Table V:

TABLE V
Effect of Charge Order On Reactivity of t-Hexadecyl Mercaptan Submicron Dispersion

| Run | Charge Order | Submicron Dispersion Added to | Regulating Index |
|---|---|---|---|
| 20 | V | Emulsifier solution | 5.1 |
| 23 | W | Styrene | 0.4 |
| 24 | X | Styrene | 0.2 |
| 25 | Y | Emulsified styrene | 4.8 |
| 26 | Z | Preemulsified polymerization solution | 4.1 |

These data illustrate that the addition of the submicron dispersion directly to the styrene, Run 23 charge order (W), and Run 24 charge order (X), results in destruction of the effectiveness of the modifier submicron dispersion. However, addition of the submicron dispersion to the emulsifier solution Run 20 charge order (V), or to styrene which has been emulsified with the emulsifier solution either alone Run 25 charge order (Y) or with all the other recipe ingredients except the activator solution Run 26 charge order (Z), provides for efficient modification.

EXAMPLE IX

The Runs in this example illustrate the incremental addition of a submicron dispersion of an organosulfur modifier to an emulsion polymerization system.

In Run 27 the t-hexadecyl mercaptan submicron dispersion (prepared using petroleum sulfonate surfactant as described in Recipe X of Example VII) was added in two increments to the SBR 1500 polymerization system, each increment providing about 0.2 phm of modifier. The initial increment was added to the emulsifier solution prior to addition of the other polymerization recipe ingredients, and the second increment was added to the polymerization reaction mixture after 30% of the monomers had been converted to polymer.

In Run 28, the second increment was preconditioned by adding to it 5 ml of a soap solution containing 1 gram of disproportionated rosin acid along with the other ingredients of the SBR 1500 polymerization soap solution, at their respective relative ratios, as shown in Recipe I in Example I.

The results of these polymerizations are shown in Table VI:

TABLE VI

| | Second Increment | Regulating Index | |
|---|---|---|---|
| Run | Treatment | First Increment | Second Increment |
| 27 | None | 6.8 | 0.8 |

TABLE VI-continued

| Run | Second Increment Treatment | Regulating Index First Increment | Second Increment |
|---|---|---|---|
| 28 | Preconditioned | 7.5 | 10.3 |

The data for Runs 27 and 28 in Table VI indicate that the effectiveness of the second increment of the modifier submicron dispersion was essentially destroyed upon being added to the polymerization reaction mixture unless it was first preconditioned with the polymerization recipe emulsifier. The higher regulating index value for the preconditioned second increment is the result of the higher surfactant plus cosurfactant-:modifier weight ratio resulting from the addition of the polymerization recipe emulsifier to the submicron emulsifier. The importance of this relationship was described earlier in Examples V and VI.

In Run 29, a submicron dispersion of an organosulfur modifier was prepared using a disproportionated rosin acid soap surfactant according to Recipe XI:

RECIPE XI
t-Hexadecyl Mercaptan Submicron Dispersion
Using Disproportionated Rosin Acid Soap
As Surfactant for Incremental Addition Study

| Ingredient | Parts by Weight |
|---|---|
| t-Hexadecyl mercaptan | 34.5 |
| Potassium salt of disproportionated rosin acid | 10.6 |
| KCl | 0.5 |
| Water | 52.8 |
| n-Hexyl alcohol | 1.6 |

The submicron dispersion above was added in two equal increments (total 0.71 phm) to an SBR 1500 polymerization system. In this run, the disproportionated rosin acid was used as both the submicron dispersion surfactant and as the polymerization emulsifier. Hence, in this run it was not necessary to precondition the second increment prior to adding it to the polymerization reaction mixture, the first increment providing a regulating index of 9.0 and the second increment a regulating index of 7.5.

EXAMPLE X

The Runs in this example illustrate the influence of neutralization of the surfactant used in preparing the submicron dispersion on the reactivity of the organosulfur modifier.

A series of t-hexadecyl mercaptan submicron dispersions was prepared using as the surfactant disproportionated rosin acid soaps having varying degrees of neutralization. As received, the disproportionated rosin acid was 85% neutralized, i.e. 85 weight % of the acid groups were in the form of the potassium salt. Submicron dispersions were prepared in which variable amounts of KOH were added to partially or fully neutralize the disproportionated rosin acid according to Recipe XII:

RECIPE XII
Submicron Dispersions Using Partially or Fully Neutralized
Disproportionated Rosin Acids as Surfactant

| Ingredient | Parts by Weight Submicron Dispersions for | | | | |
|---|---|---|---|---|---|
| | Run 30 | Run 31 | Run 32 | Run 33 | Run 34 |
| t-Hexadecyl mercaptan | 34.2 | 33.9 | 33.7 | 33.9 | 34.0 |
| Potassium salt of disproportionated rosin acid | 10.5 | 10.5 | 10.4 | 10.5 | 10.5 |
| KCl | 0.5 | 0.5 | 0.4 | 0.4 | 0.4 |
| KOH | 0 | 0.18 | 0.26 | 0.36 | 0.54 |
| Water | 52.2 | 51.6 | 51.3 | 51.5 | 51.6 |
| n-Hexyl alcohol | 2.6 | 3.4 | 3.9 | 3.4 | 3.0 |

A sufficient quantity of each of these submicron dispersions to provide about 0.4 phm modifier was added to the SBR 1500 polymerization system by injecting onto the surface of the stirred emulsifier solution. The reactivity of these submicron dispersions increased as the neutralization was increased to 100%, wherein it then tended to decrease with increasing excess of KOH, as reflected by the data in Table VII:

TABLE VII
Influence of Degree of Neutralization of Disproportionated
Rosin Acid on Reactivity of t-Hexadecyl
Mercaptan Submicron Dispersion

| Run | Percent Neutralized | pH of Submicron Dispersion | Regulating Index |
|---|---|---|---|
| 30 | 85 | 9.6 | 9.4 |
| 31 | 95 | 10.0 | 12.4 |
| 32 | 100 | 11.1 | 13.6 |
| 33 | 105 | 12.2 | 13.1 |
| 34 | 115 | 12.7 | 12.4 |

A second series of runs was made to illustrate that the increase in reactivity with increasing neutralization occurs over a range of surfactant plus cosurfactant-:modifier weight ratios. Submicron dispersions were prepared according to Recipe XIII:

RECIPE XII
Submicron Dispersions Using Fully Neutralized
Disproportionated Rosin Acids as Surfactant and at Different
Surfactant Plus Cosurfactant:Modifier Weight Ratios

| Ingredients | Parts by Weight Submicron Dispersions For | | | | | |
|---|---|---|---|---|---|---|
| | Run 35 | Run 36 | Run 37 | Run 38 | Run 39 | Run 40 |
| t-Hexadecyl mercaptan | 34.5 | 34.2 | 34.5 | 34.1 | 35.0 | 34.2 |
| Potassium salt of disproportionated rosin acid | 5.3 | 5.3 | 10.6 | 10.5 | 21.6 | 21.1 |
| KCl | 0.6 | 0.5 | 0.5 | 0.5 | 0.4 | 0.3 |
| KOH | 0 | 0.13 | 0 | 0.27 | 0 | 0.53 |
| Water | 58.0 | 57.5 | 52.8 | 51.9 | 42.9 | 41.3 |
| n-Hexyl alcohol | 1.6 | 2.3 | 1.6 | 2.7 | 0.1 | 2.6 |

The submicron dispersions were added to the SBR 1500 polymerization system according to the procedure described for Run 2 of Example I at a level to provide about 0.4 phm of the modifier. The results are shown in Table VIII:

TABLE VIII

Influence of Neutralization on Reactivity at Different Surfactant plus Cosurfactant:Modifier Weight Ratios

| Run | Surfactant plus Cosurfactant: Modifier Weight Ratio | Percent Neutralized | Regulating Index |
|---|---|---|---|
| 35 | 1:5 | 85 | 2.8 |
| 36 | 1:5 | 100 | 3.4 |
| 37 | 1:3 | 85 | 4.1 |
| 38 | 1:3 | 100 | 4.8 |
| 39 | 1:1.5 | 85 | 4.7 |
| 40 | 1:1.5 | 100 | 7.0 |

The data in Table VIII confirm that the reactivity of the modifier is higher when fully neutralized disproportionated rosin acid is used as surfactant and that this is observed over a range of weight ratios of surfactant plus cosurfactant-modifier. Furthermore, the data in Table VIII also show the increase in reactivity with increase in surfactant plus cosurfactant-modifier weight ratio as earlier described in Examples V and VI.

EXAMPLE XI

The Runs in this example illustrate the influence on reactivity of the organosulfur modifier of the incorporation of an inert hydrocarbon in the submicron dispersion.

A series of runs was made with organosulfur modifier submicron dispersions employing t-hexadecyl mercaptan, prepared using neutralized disproportionated rosin acid surfactant, and in which half the usual t-hexadecyl mercaptan in each dispersion was replaced either with an inert hydrocarbon or with styrene monomer. These submicron dispersions were prepared according to Recipe XIV:

RECIPE XIV

Submicron Dispersions Containing Equal Amounts of t-Hexadecyl Mercaptan and Hydrocarbon Parts by Weight Submicron Dispersions For

| Ingredient | Run 41 | Run 42 | Run 43 | Run 44 | Run 45 | Run 46 |
|---|---|---|---|---|---|---|
| t-Hexadecyl mercaptan | 34.3 | 16.7 | 16.1 | 16.7 | 34.1 | 16.5 |
| Ethylbenzene | — | 20.6 | — | — | — | 20.4 |
| n-Dodecane | — | — | 20.0 | — | — | — |
| Styrene | — | — | — | 20.6 | — | — |
| Potassium salt of disproportionated rosin acid | 21.2 | 20.6 | 20.0 | 20.6 | 10.5 | 10.2 |
| KCl | 0.5 | 0.5 | 0.5 | 0.5 | 0.6 | 0.6 |
| KOH | 0.55 | 0.53 | 0.52 | 0.53 | 0.27 | 0.26 |
| Water | 41.3 | 40.0 | 38.9 | 40.1 | 51.8 | 50.1 |
| n-Hexyl alcohol | 2.2 | 1.1 | 4.0 | 1.0 | 2.8 | 2.0 |

| Ingredient | Run 47 | Run 48 | Run 49 | Run 50 | Run 51 | Run 52 |
|---|---|---|---|---|---|---|
| t-Hexadecyl mercaptan | 16.4 | 16.5 | 34.2 | 16.5 | 16.5 | 16.5 |
| Ethylbenzene | — | — | — | 20.4 | — | — |
| n-Dodecane | 20.2 | — | — | — | 20.3 | — |
| Styrene | — | 20.4 | — | — | — | 20.4 |
| Potassium salt of disproportionated rosin acid | 10.1 | 10.2 | 5.3 | 5.1 | 5.1 | 5.1 |
| KCl | 0.6 | 0.6 | 0.6 | 0.6 | 0.6 | 0.6 |
| KOH | 0.26 | 0.26 | 0.15 | 0.14 | 0.14 | 0.14 |
| Water | 49.7 | 50.0 | 57.4 | 55.4 | 55.2 | 55.4 |
| n-Hexyl alcohol | 2.8 | 2.1 | 2.4 | 1.8 | 2.2 | 1.9 |

The submicron dispersions prepared according to Recipe XIV were added to the SBR 1500 polymerization system at a level to provide about 0.4–0.6 phm of t-hexadecyl mercaptan. The results are shown in Table IX:

TABLE IX

Effect of Replacing t-Hexadecyl Mercaptan With Hydrocarbon on Reactivity of Submicron Dispersion

| Run | Hydrocarbon | Weight Ratio of t-Hexadecyl Mercaptan:Hydrocarbon: Surfactant Plus Cosurfactant | Regulating Index |
|---|---|---|---|
| 41 | None | 1.5:0:1 | 5.1 |
| 42 | Ethylbenzene | 1:1:1 | 6.8 |
| 43 | n-Dodecane | 1:1:1 | 5.4 |
| 44 | Styrene | 1:1:1 | 6.6 |
| 45 | None | 2.5:0:1 | 5.7 |
| 46 | Ethylbenzene | 1.5:1.5:1 | 11.7 |
| 47 | n-Dodecane | 1.5:1.5:1 | 4.9 |
| 48 | Styrene | 1.5:1.5:1 | 7.3 |
| 49 | None | 4.5:0:1 | 5.2 |
| 50 | Ethylbenzene | 2.5:3:1 | 6.4 |
| 51 | n-Dodecane | 2.5:3:1 | 3.9 |
| 52 | Styrene | 2.5:3:1 | 6.6 |

As shown by the data in Table IX, whereas the addition of ethylbenzene or styrene to the submicron dispersion results in a higher regulating index compared to the control Runs 41, 45 and 49, the addition of dodecane provides a means of lowering the regulating index, the degree of lowering being a function of the weight ratio of surfactant plus cosurfactant:modifier plus hydrocarbon.

An additional series of runs was made which illustrates the effect of varying the weight ratio of t-hexadecyl mercaptan:hydrocarbon on the reactivity of the submicron dispersion. Submicron dispersions using petroleum sulfonate as surfactant were prepared according to Recipe XV:

RECIPE XV

Submicron Dispersions Containing Equal Amounts of t-Hexadecyl Mercaptan and Hydrocarbon at Varying Weight Ratios Parts by Weight Submicron Dispersions For

| Ingredient | Run 53 | Run 54 | Run 55 | Run 56 | Run 57 |
|---|---|---|---|---|---|
| t-Hexadecyl mercaptan | 36.0 | 26.5 | 17.3 | 8.5 | 26.5 |
| Ethylbenzene | — | 10.9 | 21.3 | 31.4 | — |
| n-Dodecane | — | — | — | — | 10.9 |
| n-Tetradecane | — | — | — | — | — |
| Petroleum sulfonate | 5.6 | 5.5 | 5.3 | 5.2 | 5.4 |
| KCl | 0.6 | 0.6 | 0.6 | 0.5 | 0.6 |
| Water | 57.6 | 56.3 | 55.3 | 54.2 | 56.4 |
| n-Hexyl alcohol | 0.2 | 0.2 | 0.2 | 0.2 | 0.2 |

| Ingredient | Run 58 | Run 59 | Run 60 | Run 61 | Run 62 |
|---|---|---|---|---|---|
| t-Hexadecyl mercaptan | 17.3 | 8.5 | 26.5 | 17.3 | 8.5 |
| Ethylbenzene | — | — | — | — | — |
| n-Dodecane | 21.3 | 31.4 | — | — | — |
| n-Tetradecane | — | — | 10.9 | 21.3 | 31.4 |
| Petroleum sulfonate | 5.3 | 5.2 | 5.5 | 5.3 | 5.2 |
| KCl | 0.6 | 0.5 | 0.6 | 0.6 | 0.5 |
| Water | 55.3 | 54.2 | 56.3 | 55.3 | 54.2 |
| n-Hexyl alcohol | 0.2 | 0.2 | 0.2 | 0.2 | 0.2 |

The submicron dispersions prepared according to Recipe XV were added to the SBR 1500 polymerization system at a level to provide about 0.4–0.5 phm of t-hexadecyl mercaptan. The data are shown in Table X:

TABLE X

Effect of t-Hexadecyl Mercaptan:Hydrocarbon Weight Ratio On Reactivity of Submicron Dispersion

| Run | Hydrocarbon | Weight Ratio of t-Hexadecyl Mercaptan:Hydrocarbon: Surfactant plus Cosurfactant | Regulating Index |
|---|---|---|---|
| 53 | None | 6:0:1 | 3.7 |
| 54 | Ethylbenzene | 4.5:2:1 | 0.7 |
| 55 | Ethylbenzene | 3:4:1 | 0.8 |
| 56 | Ethylbenzene | 1.5:6:1 | 0.9 |
| 57 | n-Dodecane | 4.5:2:1 | 3.9 |
| 58 | n-Dodecane | 3:4:1 | 3.1 |
| 59 | n-Dodecane | 1.5:6:1 | 2.5 |
| 60 | n-Tetradecane | 4.5:2:1 | 3.7 |
| 61 | n-Tetradecane | 3:4:1 | 3.1 |
| 62 | n-Tetradecane | 1.5:6:1 | 2.5 |

The data in Table X illustrate the reduction in reactivity of t-hexadecyl mercaptan submicron dispersion as modifier as a function of increasing weight ratio of the hydrocarbons n-dodecane and n-tetradecane. This trend is not observed with ethylbenzene within this range of mercaptan:hydrocarbon ratios, all submicron dispersions evaluated containing ethylbenzene having a rather uniformly lower reactivity than the control without added hydrocarbon.

EXAMPLE XII

The Runs in this example illustrate a variation in submicron dispersion preparation and charging procedure wherein a submicron dispersion of the mercaptan modifier and all the SBR 1500 recipe styrene was prepared using a concentrated form of the SBR 1500 recipe soap solution as the surfactant.

Additional water, butadiene and oxidant were added to this submicron dispersion, the mixture preemulsified for 30 minutes while bringing to the 5° C. polymerization temperature, and the polymerization then activated.

Two submicron dispersions were prepared using either t-hexadecyl mercaptan or n-hexadecyl mercaptan and all of the recipe styrene, and the remaining ingredients added according to Recipe XVI:

RECIPE XVI
Modified SBR 1500 Polymerization System

| | Parts by Weight | |
|---|---|---|
| | Run 63 | Run 64 |
| Submicron Dispersion Recipe | | |
| t-Hexadecyl mercaptan | 0.56 | — |
| n-Hexadecyl mercaptan | — | 0.75 |
| Potassium salt of disproportionated rosin acid | 4.6 | 4.6 |
| KOH | 0.11 | 0.11 |
| KCl | 0.3 | 0.3 |
| Sodium salts of Polymerized alkylnaphthalene sulfonic acids | 0.2 | 0.2 |
| Tetrahydrate of the sodium salt of ethylene diamine tetraacetic acid | 0.016 | 0.016 |
| Styrene | 30 | 30 |
| Water | 40 | 40 |
| n-Hexyl alcohol | 1.62 | 1.62 |
| Additional Diluent | | |
| Water | 130 | 130 |
| Additional Monomer | | |
| Butadiene | 70 | 70 |
| Oxidant | | |
| p-Menthane hydroperoxide | 0.12 | 0.12 |
| Activator Solution | | |
| Tetrahydrate of the sodium salt of ethylenediamine tetraacetic acid | 0.064 | 0.064 |
| FeSO$_4$.7H$_2$O | 0.02 | 0.02 |
| NaO$_2$SCH$_2$OH.2H$_2$O | 0.10 | 0.10 |
| Water | 20 | 20 |
| Polymerization temperature, °C. | 5 | 5 |
| Shortstop | | |
| Sodium dimethyl dithiocarbamate | 0.16 | 0.16 |
| Water | 10 | 10 |

The reactivity of the t-hexadecyl mercaptan as a modifier, using this variation in submicron dispersion preparation and charge order, as illustrated by a regulating index of 4.9 for Run 63 was similar to that obtained using the procedure described previously (Run 37 of Example VI had regulating index of 4.1), and considerably higher than when neat t-hexadecyl mercaptan was added to the polymerization reaction mixture as shown by the regulating index of 0.3 for Run 1 of Example I.

n-Hexadecyl mercaptan, when used according to this variation (Run 64), had a regulating index of 3.1. When added neat to the SBR 1500 polymerization system, n-hexadecyl mercaptan exhibited no depletion (regulating index of 0), and when added as a submicron dispersion by the normal procedure described, for Run 2 of Example I, a regulating index of only 0.4 was obtained. Thus this modified procedure for preparing the submicron dispersion wherein all the styrene is included, provides a method whereby n-hexadecyl mercaptan can be effectively used as modifier.

EXAMPLE XIII

The Runs in this example illustrate the use of various cosurfactants in preparing submicron dispersions.

A series of organosulfur modifier submicron dispersions was prepared according to Recipe IX of Example VII using five different alcohols as cosurfactants. Each of these submicron dispersions then was used in an SBR 1500 polymerization system using the procedure described for Run 2 of Example I. The results are shown in Table XI:

TABLE XI

Reactivity of Submicron Dispersions Prepared Using Various Alkanols as Cosurfactants

| Run | Alkanol | Regulating Index |
|---|---|---|
| 17 | n-Hexyl alcohol | 6.2 |
| 65 | n-Octyl alcohol | 5.6 |
| 66 | n-Decyl alcohol | 6.0 |
| 67 | n-Dodecyl alcohol | 5.6 |
| 68 | n-Tetradecyl alcohol | 6.7 |

The data for the Runs in Table XI illustrate that different alkanol cosurfactants have relatively small effect on the reactivity of the t-hexadecyl mercaptan submicron dispersion as modifier.

EXAMPLE XIV

The Runs in this example illustrate the use of various electrolytes in preparing submicron dispersions of organosulfur compounds.

Various potassium salts were used to prepare a series of t-hexadecyl mercaptan submicron dispersions according to Recipe XVII:

RECIPE XVII
Submicron Dispersions Prepared Using Various Electrolytes

| Ingredient | Parts by Weight Submicron Dispersions For | | | | | |
|---|---|---|---|---|---|---|
| | Run 69 | Run 70 | Run 71 | Run 72 | Run 73 | Run 74 |
| t-Hexadecyl mercaptan | 36.8 | 36.6 | 37.1 | 37.0 | 37.1 | 37.2 |
| Petroleum sulfonate | 11.4 | 11.3 | 11.4 | 11.4 | 11.5 | 11.5 |
| $K_2CO_3$ | 0.5 | — | — | — | — | — |
| $K_3PO_4$ | — | 0.5 | — | — | — | — |
| $KH_2PO_4$ | — | — | 0.5 | — | — | — |
| $K_2B_4O_7 \cdot 5H_2O$ | — | — | — | 0.5 | — | — |
| $KC_2H_3O_2$ | — | — | — | — | 0.5 | — |
| KCl | — | — | — | — | — | 0.5 |
| Water | 50.9 | 51.2 | 50.5 | 50.4 | 50.6 | 50.7 |
| n-Hexyl alcohol | 0.4 | 0.4 | 0.5 | 0.7 | 0.3 | 0.1 |

The submicron dispersions prepared in accordance with Recipe XVII were used in the SBR 1500 polymerization at a level to provide about 0.4 phm of the mercaptan, using the procedure described for Run 2 in Example I. The results are shown in Table XII:

TABLE XII

Reactivity of Submicron Dispersions Prepared Using Various Electrolytes

| Run | Electrolyte | Regulating Index |
|---|---|---|
| 69 | $K_2CO_3$ | 6.7 |
| 70 | $K_3PO_4$ | 6.7 |
| 71 | $KH_2PO_4$ | 6.9 |
| 72 | $K_2B_4O_7 \cdot 5H_2O$ | 6.1 |
| 73 | $KC_2H_3O_2$ | 6.2 |
| 74 | KCl | 5.9 |

The data in Table XII illustrate that the use of different potassium salts as electrolytes had relatively small effect on the reactivity of the t-hexadecyl mercaptan submicron dispersion as modifier.

EXAMPLE XV

The Runs in this example illustrate the relationship between the particle size of the dispersed organosulfur modifier after addition to the polymerization soap solution, and the regulating index of this highly dispersed modifier.

A series of t-hexadecyl mercaptan dispersions were prepared according to Recipe XVIII:

RECIPE XVIII
t-Hexadecyl Mercaptan Submicron Dispersions
For Particle Size and Modifier Reactivity Correlation

| Ingredient | Parts by Weight Submicron Dispersions For | | | | |
|---|---|---|---|---|---|
| | Run 53 | Run 75 | Run 76 | Run 77 | Run 10 |
| t-Hexadecyl mercaptan | 36.0 | 36.0 | 37.1 | 39.3 | 31.0 |
| Petroleum Sulfonate | 5.6 | 5.6 | 11.5 | 24.3 | 19.2 |
| KCl | 0.6 | 0.6 | 0.5 | 0.3 | 0.5 |
| Water | 57.6 | 57.6 | 50.7 | 35.1 | 48.8 |
| n-Hexyl alcohol | 0.2 | 0.2 | 0.2 | 1.0 | 0.5 |

The mercaptan dispersions prepared as shown in Recipe XVIII were added to the SBR 1500 polymerization system at a level to provide about 0.4 to 0.6 phm t-hexadecyl mercaptan and the reactivity of each of these submicron dispersions as a modifier determined. A second sample of each of these submicron dispersions was added to the SBR 1500 polymerization recipe soap solution at a concentration of 0.3 grams of submicron dispersion per 100 ml. of polymerization soap solution (this would be equivalent to adding sufficient submicron dispersion to a SBR 1500 polymerization system to provide about 0.2 phm t-hexadecyl mercaptan) and the particle size diameters of these submicron dispersions were determined by a light scattering dissymmetry method described in P. Doty and R. F. Steiner, J. Chem. Phys. 18, 1211 (1950) with the appropriate reflection corrections being made by a procedure described in H. Sheffer and J. C. Hyde, Can. J. Chem. 30, 817 (1952). The results are shown in Table XIII:

TABLE XIII

Modifier Reactivity as a Function of Particle Size

| Run | Regulating Index[a] | Particle Size Diameter,[b] Å |
|---|---|---|
| 53 | 3.7 | 1000 |
| 75 | 4.2 | 1120 |
| 76 | 8.2 | 790 |
| 77 | 8.7 | 820 |
| 10 | 10.3 | 760 |

[a] As determined in a SBR 1500 polymerization system.
[b] As determined by light scattering measurements.

The data in Table XIII illustrate correlation between the regulating index of these submicron dispersions when used in the SBR 1500 polymerization system and the particle size of the dispersed modifier as determined by the light scattering dissymmetry method.

Although the particle size measurements were made on a soap solution having a lower concentration of organosulfur modifier than was used to determine the regulating index and thus the absolute particle sizes determined may not represent that which were actually present in the SBR polymerization system, these data to indicate that within the range tested, the smaller the particle size of the dispersed modifier, the higher the modifier reactivity.

EXAMPLE XVI

Modification of Chloroprene

Chloroprene emulsified with Dresinate soap and initiated with presulfate was polymerized at 15° C. in presence of neat mercaptans and highly dispersed emulsions of mercaptans. The n- and t-dodecyl mercaptans were highly dispersed with Dresinate 554 surfactant, and t-hexadecyl; and n-octadecyl mercaptans were dispersed with petroleum sulfonate surfactant. Polymerization and characterization data of the polychloroprenes are given in Table XIV:

TABLE XIV

Modifying Chloroprene Emulsion Polymerization With Neat and Emulsified Mercaptans

| Run | Mercaptan[a] | Added | Pzn. Rate, %/Hr | $C_{tr}$[b] | Inherent Visc., dl/g[c] | Gel. % | HI[d] |
|---|---|---|---|---|---|---|---|
| 78 | n-$C_{12}$ | neat | 7.0 | 0.76 | 1.01 | 0 | 2.67 |
| 79 | n-$C_{12}$ | emulsion | 8.0 | 1.06 | 0.64 | 0 | 2.20 |
| 80 | t-$C_{12}$ | neat | 9.8 | 0.30 | 2.18 | 0 | 5.54 |
| 81 | t-$C_{12}$ | emulsion | 8.6 | 0.33 | 1.50 | 0 | 3.00 |
| 82 | t-$C_{16}$ | neat | 9.9 | 0.51 | 2.69[e] | 96 | — |
| 83 | t-$C_{16}$ | emulsion | 9.9 | 0.87 | 2.73 | 0 | — |
| 84 | n-$C_{18}$ | emulsion | 9.4 | 1.15 | 1.49[e] | 63 | — |

[a] Approximately 0.5 phm.
[b] Transfer constant.
[c] Determined in toluene solvent.
[d] Relative heterogeneity index based on standard polystyrene calibration curve and determined in THF.
[e] Soluble portion only.

The transfer constants for neat n- and t-dodecyl mercaptans are fairly close to some values reported in J. W. McFarland and R. Pariser, J. Appl., Polymer Sci. 7, 675 (1963), and the inherent viscosities and GPC curves follow in an expected manner. The transfer constants found for t-hexadecyl and n-octadecyl mercaptans were higher than expected in comparison to the lower homologues, and the modification was not as efficient as expected on basis of the modification parameters. This unpredicted behavior might find its explanation in the exceptional polymerization and modification kinetics reported for chloroprene in emulsion systems by M. Morton and I. Piirma, J. Polym. Sci. 19, 563 (1956).

The higher transfer constant ($C_{tr}$) for the polymerization, utilizing the highly dispersed mercaptan modifier compared to the transfer constants for the polymerizations using neat mercaptans as modifiers illustrates the better modification efficiency which is attainable by using a highly dispersed organosulfur modifier. This improvement is also shown by the lower inherent viscosity (enhanced modification efficiency) of the polymer produced using the highly dispersed mercaptan modifiers.

The disclosure, including data, has illustrated the value and effectiveness of our invention. The examples, the knowledge and background of the field of the invention and the general principles of chemistry and other applicable sciences, have formed the bases from which the broad descriptions of the invention including the ranges of conditions and the generic groups of operant components have been developed, and have formed the bases for our claims here appended.

What is claimed is:

1. A composition suitable for use as a molecular weight modifier in emulsion polymerization comprising a submicron dispersion formed by admixing at least one organosulfur molecular weight modifier, at least one aqueous surfactant, at least one electrolyte, and at least one cosurfactant selected from the group consisting of compounds having 3 to 20 carbon atoms per molecule and the formula of ROH, RCOOH, or $RNH_2$ wherein R is an alkyl radical, and optionally at least one hydrocarbon under conditions to reduce the average particle size of said molecular weight modifier in said submicron dispersion to less than about 10,000 Å.

2. A composition according to claim 1 wherein each said organosulfur molecular weight modifier is selected from the group consisting of mercaptan, dialkyldixanthogen, diaryldisulfide, tetraalkylthiuram mono- or disulfide, and mercaptothiazole.

3. A composition according to claim 2 wherein each said surfactant is selected from the group consisting of rosin acid soap, disproportionated rosin acid soap, fatty acid soap, alkyl or alkaryl sulfonate, petroleum alkali metal sulfonates, alkyl alkali metal sulfate, amine and ammonium soaps, and nonionic emulsifiers.

4. A composition according to claim 3 wherein said electrolyte is selected from at least one of the group consisting of sodium chloride, potassium chloride, sodium carbonate, potassium carbonate, potassium phosphate, potassium dihydrogen phosphate, sodium borate, potassium bromide, potassium nitrate, potassium acetate, potassium sulfate, ammonium acetate, ammonium hydrogen phosphate, lithium iodide, lithium bisulfate, pyridine hydrochloride, and triethylaminehydrochloride, and is employed at a level of about 1:10,000 to 5:100 electrolyte:modifier weight ratio, wherein the weight of said modifier includes that of any hydrocarbon present.

5. A composition according to claim 4 wherein each said cosurfactant contains 4 to 12 carbon atoms per molecule.

6. A composition according to claim 5 wherein the weight ratio of surfactant to modifier is in the range of about 100:1 to 1:100 and the weight ratio of cosurfactant to modifier is in the range of about 10:1 to 1:500.

7. A composition according to claim 6 wherein said hydrocarbon is incorporated with said surfactant and wherein said hydrocarbon is a hydrocarbon diluent or a polymerizable hydrocarbon monomer or both.

8. A composition according to claim 7 wherein said hydrocarbon comprises polymerizable monomer.

9. A composition according to claim 7 wherein said hydrocarbon is selected from the group consisting of n-heptane, isooctane, dodecane, hexadecane, cyclohexane, ethylcyclohexane, toluene, ethylbenzene, cumene, p-cymene, decalin, and mixtures thereof.

10. A composition according to claim 7 wherein the weight ratio of said organosulfur compound to hydrocarbon is in the range of about 1:100 to 100:1.

11. A composition according to claim 10 wherein the weight ratio of organosulfur compound:hydrocarbon is in the range of about 1:5 to 5:1.

12. A composition according to claim 11 wherein each said organosulfur molecular weight modifier is a hydrocarbyl mercaptan of 8 to 18 carbon atoms per molecule.

13. A composition according to claim 12 wherein said modifier is t-hexadecyl mercaptan, said hydrocarbon is ethylbenzene, said electrolyte is potassium chloride, said cosurfactant is n-hexyl alcohol, and said surfactant is potassium salt of disproportionated rosin acid.

14. A composition according to claim 12 wherein said modifier is t-hexadecyl mercaptan, said hydrocarbon is styrene, said electrolyte is potassium chloride, said cosurfactant is n-hexyl alcohol, and said surfactant is potassium salt of disproportionated rosin acid.

15. A composition according to claim 12 wherein said modifier is t-hexadecyl mercaptan, said hydrocarbon is n-dodecane, said electrolyte is potassium chloride, said cosurfactant is n-hexyl alcohol, and said surfactant is potassium salt of disproportionated rosin acid.

16. A composition according to claim 12 wherein said molecular weight modifier is t-hexadecyl mercaptan, and said surfactant is petroleum sulfonate, said electrolyte is potassium chloride, and said cosurfactant is n-hexyl alcohol.

17. A composition according to claim 12 wherein said molecular weight modifier is t-dodecyl mercaptan, said surfactant is petroleum sulfonate, said electrolyte is potassium chloride, and said cosurfactant is n-hexyl alcohol.

18. A composition according to claim 12 wherein said modifier is t-dodecyl mercaptan, said surfactant is potassium salt of disproportionated rosin acid, said electrolyte is potassium chloride, and said cosurfactant is n-hexyl alcohol.

19. A composition according to claim 12 wherein said modifier is t-dodecyl mercaptan, said surfactant is potassium fatty acid soap, said electrolyte is potassium chloride, and said cosurfactant is n-hexyl alcohol.

20. A composition according to claim 12 wherein said modifier is t-hexadecyl mercaptan, said surfactant is potassium salt of disproportionated rosin acid, said electrolyte is potassium chloride, and said cosurfactant is n-hexyl alcohol.

21. A composition according to claim 12 wherein said modifier is t-hexadecyl mercaptan, said surfactant is a potassium salt of disproportionated rosin acid, said electrolyte is sodium chloride, and said cosurfactant is n-hexyl alcohol.

22. A composition according to claim 12 prepared by steps which comprise adding together said organosulfur molecular weight modifier and a surfactant containing an electrolyte, in aqueous media, under conditions effective to form a macroemulsion wherein the particle size of the organosulfur modifier is in the range of about 10,000 Å to 100,000 Å, and adding to the resulting macroemulsion admixture a cosurfactant under conditions and in amounts sufficient to effectuate a particle size reduction of said organosulfur compound to the order of at least less than 10,000 Å, thereby resulting in said submicron dispersion of said organosulfur compound, said submicron dispersion characterized as being translucent to clear.

23. A composition according to claim 12 prepared by steps which comprise preparing an emulsion of an aqueous emulsion polymerizable monomer, surfactant which is to serve as emulsifier for the aqueous emulsifier solution, organosulfur modifier, electrolyte, and water, and adding to this emulsion a cosurfactant, thereby forming a submicron dispersion of said organosulfur modifier.

* * * * *